W. S. INGRAM.
SAFETY AIR BRAKE VALVE.
APPLICATION FILED JUNE 10, 1916.

1,212,955.

Patented Jan. 16, 1917.

Inventor
William S. Ingram,
By Edwin Guthrie,
Attorney

UNITED STATES PATENT OFFICE.

WILLIAM S. INGRAM, OF RALEIGH, NORTH CAROLINA.

SAFETY AIR-BRAKE VALVE.

1,212,955.  
Specification of Letters Patent.  
Patented Jan. 16, 1917.

Application filed June 10, 1916. Serial No. 102,843.

*To all whom it may concern:*

Be it known that I, WILLIAM S. INGRAM, a citizen of the United States, residing at Raleigh, in the county of Wake and State of North Carolina, have invented certain new and useful Improvements in Safety Air-Brake Valves, of which the following is a specification.

This invention relates to safety air brake valves, and it belongs to that class of valvular contrivances which are intended and adapted to bleed the train pipe of the air brake system beneath a car and to apply the brakes, when there is by reason of derailment or other cause an extraordinary relative movement of the car truck with respect to the car body.

The object of this invention is the production of an air valve having the general character stated, but, possessing parts of special construction and arrangement, whereby the brakes may be set by operating this invention by hand if desired, or by an unusual up or down, or horizontally turning movement of the car truck with regard to the car frame.

Figure 1:
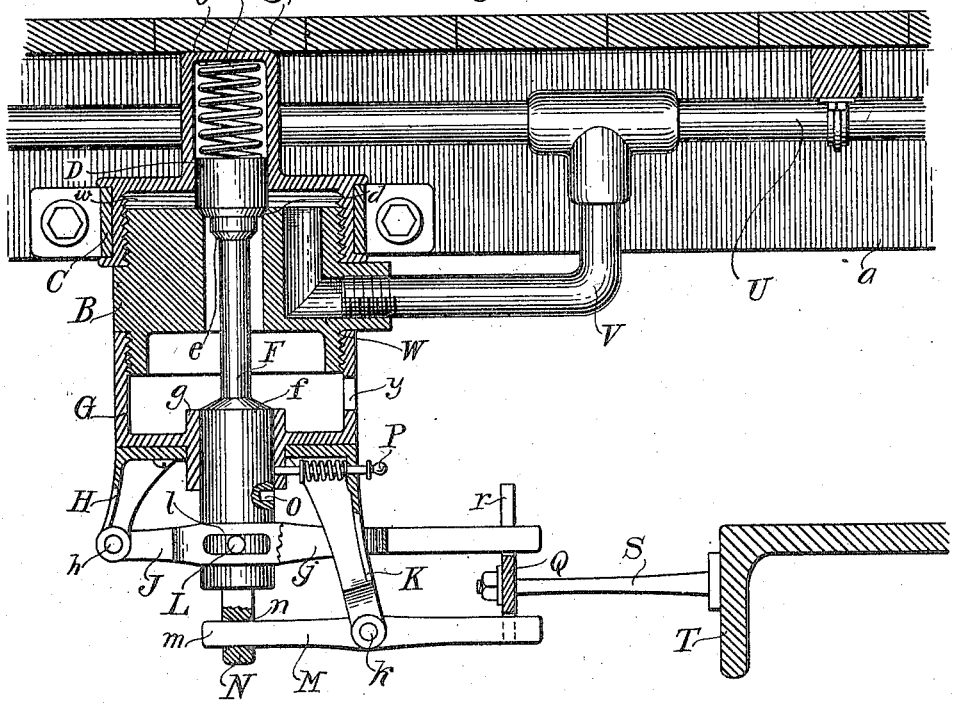
Figure 2:
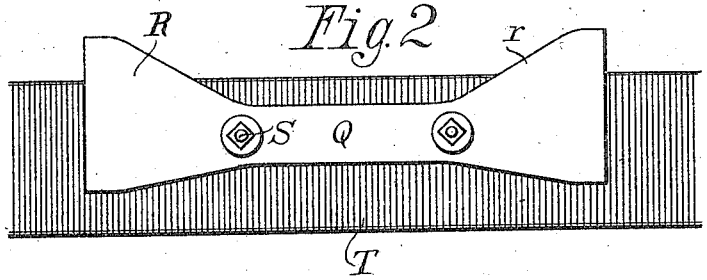

In the accompanying drawings, the construction and arrangement of the essential parts of this invention are illustrated, and Figure 1 represents a portion of the under frame of a car and a portion of the bolster or other member of the car truck, with this invention applied thereto and shown in vertical section. Fig. 2 is a front view of the operating striker or wedge bar located between the ends of the levers that act upon the valve.

Throughout the description and drawings, the same letter is employed to refer to the same part.

Considering the drawings, there is shown a portion of the floor A of a car, and a portion of the under frame $a$. The casing or main portion of this invention comprises the body B and the removable screw top $b$. The casing is secured to the car frame $a$, by means of the strap clamp C encircling the cap $b$.

A valve D controls the valve seat $d$ in the body B, and the coil spring E in the raised center of the cap $b$ holds the valve yieldingly to its seat. Immediately below the valve D is an enlargement $e$ of the stem F, and the lower part of the stem F has usually a cylindrical portion $f$ passing centrally through the lower cupped portion G of the casing, and guided in the throat $g$ provided for the purpose in the bottom of the cup G.

Extending below the cup or bottom G of the casing is a hanger H having a pivotal connection $h$ with a lever J. The lever J has an open portion $j$ between its ends, through which pass the lower part $f$ of the valve stem, and a second hanger K shown in Fig. 1. A pin L projects from the lower part $f$ of the valve stem and engages a horizontal slot $l$ in the side of the open portion of the lever J. It will be understood that the pin L passes diametrically through the lower part F of the valve stem and engages a corresponding slot on the other side of the lever. It is believed to be now clear that when the lever J is moved, the valve will be raised from its seat. It will be noted further in Fig. 1, that the hanger H and the pivotal joint $h$ with the lever J is on the left hand side of the casing in Fig. 1, and that the hanger K is on the right hand side. That is to say, the pivotal joint $k$ that connects the hanger K and the lower lever M lies on the opposite side of the stem F from the pivotal joint $h$ mentioned. The inner end $m$ of the lower lever M passes through a lug N projecting downwardly from the stem, an opening $n$ being formed in the lug N of suitable shape for the purpose of permitting the necessary slant of the end of the lever with respect to the lug when the lever is operated.

In Fig. 1 there will be observed an opening O formed in the side of the lower part $f$ of the valve stem, and it will be understood that if the stem is raised high enough, the spring pin P carried by the hanger K will enter the opening O and the valve stem and valve will be held until released, in their raised position. As illustrated in Fig. 1, there is arranged between the outer ends of the upper lever J and the lower lever M, the striker or operating bar Q. This member is composed, as best set out in Fig. 2, of a straight middle portion and wedge-shaped ends R and $r$. The striker bar is supported by means of arms such as the arm S connected with the bolster T of the car truck, or some other convenient portion of the truck. Again considering Fig. 1, it will be noted that the train pipe U, supported beneath the car floor, is connected by means of the pipe V with the elbow channel W in the body B of the casing. Thus, the train pipe pressure fills the chamber $w$ in the casing above the valve. Below the valve, the casing is open to the atmosphere by way of the outlet $y$.

In explaining the operation of this invention, let it be assumed that it is desired to set the brakes by hand by bleeding the train pipe slightly. It will be seen that this can be accomplished by raising the outer end of the upper lever J, and that this lever is arranged to afford increased leverage upon the valve stem. The valve is raised slightly, and usually not high enough to bring the shoulder or enlargement $e$ up to the valve seat or to cause the spring pin P to engage the catch opening O. The lever J being lowered, the valve is reseated by the coil spring E. The rise and fall of the valve is adequately guided by the engagement of the lower part $f$ of the stem, and the throat $g$ of the lower part G of the casing. As soon as the valve is unseated, the air escapes downwardly through the hollow middle part of the body B, and through the outlet $y$ in the wall of the bottom portion G of the casing.

Let it be now assumed that an extraordinary upward movement of the part T of the car truck takes place, occasioned for example by the breaking of a truck spring or by the truck leaving the track, or being in any manner tilted upwardly in that part which carries the striker bar. Or, the movement being the same in effect, let it be supposed that the frame of the car descends with respect to the bolster T of the car truck. The bar Q will raise the lever J at its outer end and the valve D will be unseated, usually far enough to permit the engagement of the spring pin P and catch opening O, and the enlargement $e$ will be carried above the seat $d$, allowing the train pipe air to escape violently and copiously and setting the brakes hard and quickly. If, on the other hand, the bolster T of the car truck moves downwardly with relation to the car frame, the outer end of the lever M will be carried downwardly and its inner end raised, thereby lifting the valve from its seat. If a movement of sufficient extent in a circular direction horizontally should be given the truck in either direction, one or the other of the wedge ends R, $r$, would be forced between the outer ends of the levers J and M, and the valve would be lifted as before explained and the brakes immediately set hard.

Having now described this invention, and explained the mode of its operation, what I claim is:

1. In a safety air brake valve, the combination with a car frame and car truck, of a casing having a valve seat, a valve controlling the said seat and having a stem portion projecting below the casing, the said casing having a chamber above the valve, a train pipe, a pipe connecting the said chamber and train pipe, upper and lower levers pivotally connected with the said casing and valve stem below the casing, and means carried by the said car truck and arranged between the ends of the levers whereby the levers will be moved and the said valve unseated when the truck moves up or down with respect to the car.

2. In a safety air brake valve, the combination with a car frame and car truck, of a casing having a valve seat, a valve controlling the said seat and having a stem portion projecting below the casing, the said casing having a closed chamber above the valve, a train pipe, a pipe connecting the said chamber with the train pipe, the said casing having an opening to the atmosphere below the said valve, upper and lower levers pivotally connected with the said valve stem and with the casing on opposite sides of the valve stem, and means carried by the said car truck and arranged between the ends of the levers whereby the levers will be moved and the said valve unseated when the truck moves up or down with respect to the said car frame.

3. In a safety air brake valve, the combination with a car frame and car truck, of a casing having a valve seat, a valve controlling the said seat and having a stem portion projecting below the casing, the said casing having a closed chamber above the valve, a train pipe, a pipe connecting the said chamber with the train pipe, the said casing having an opening to the atmosphere below the valve, upper and lower levers pivotally connected with the said valve stem and with the casing upon opposite sides of the valve stem, and means carried by the said car truck and arranged between the ends of the levers whereby the levers will be moved and the said valve raised from its seat when the truck moves up or down with respect to the said car frame, the said valve-raising means comprising a straight middle portion and wedge-shaped ends whereby the said levers are moved and the valve unseated when the truck turns horizontally with respect to the car frame.

4. In a safety air brake valve, the combination with a car frame and car truck, of a casing having a valve seat, a valve controlling the said seat and having a stem portion projecting below the casing, the said casing having a closed chamber above the valve, a train pipe, a pipe connecting the said chamber with the train pipe, the said casing having an opening to the atmosphere below valve, upper and lower levers pivotally connected with the said valve stem and with the casing on opposite sides of the valve stem, means carried by the said car truck and arranged between the ends of the levers whereby the levers will be moved and the said valve raised from the said seat when the truck moves up or down with respect to the said car frame, and releasable means borne by the casing and the valve stem for holding the said valve in a predetermined raised position.

In testimony whereof I affix my signature.

WILLIAM S. INGRAM.